April 6, 1926.
H. F. PLATT
1,579,391
METHOD AND DEVICE FOR REPAIRING TIRES
Filed April 21, 1925
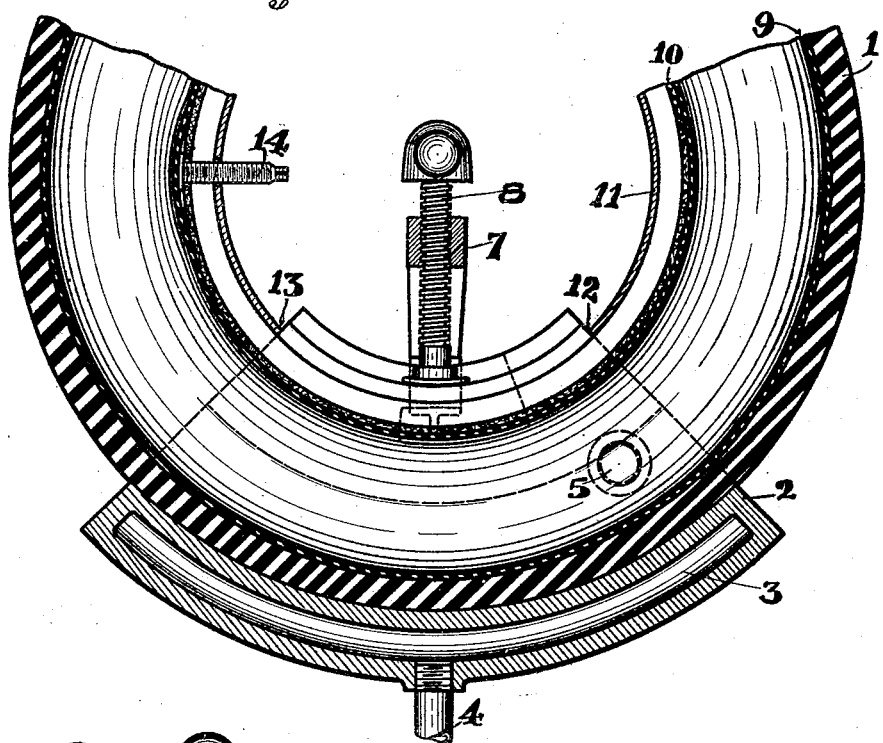
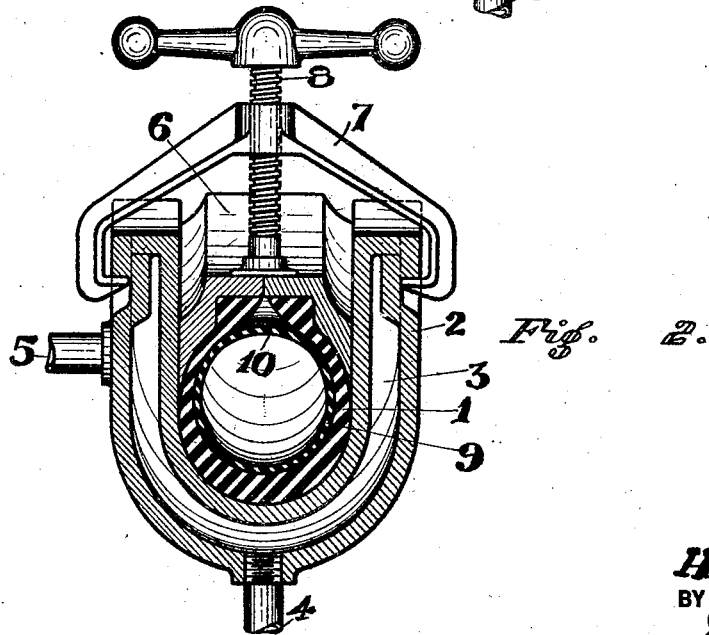
INVENTOR
*Hugo F. Platt*
BY
*J. E. Frabucco*
ATTORNEY Patented Apr. 6, 1926.

1,579,391

UNITED STATES PATENT OFFICE.

HUGO F. PLATT, OF SAN FRANCISCO, CALIFORNIA.

METHOD AND DEVICE FOR REPAIRING TIRES.

Application filed April 21, 1925. Serial No. 24,787.

*To all whom it may concern:*

Be it known that I, HUGO F. PLATT, a citizen of the United States, residing in the city and county of San Francisco and State of California, have invented new and useful Improvements in Methods and Devices for Repairing Tires, of which the following is a specification.

This invention relates to the method and apparatus for repairing automobile tires, and has for its primary object to provide a novel method and improved device for conveniently and inexpensively making repairs to the casings of damaged automobile tires.

At the present time tires are repaired and vulcanized in molds wherein air bags are used to inflate the section of the casing to be repaired. The use of air bags has proven to be very expensive in vulcanizing tires, principally because they frequently break and are not easily repaired. Under the methods now used, the tire can not be repaired in sections corresponding to the full length of the mold, for the reason that the air bags are not constructed so as to permit such repairs, and are often too long or too small to perform satisfactory results.

The present invention affords a simplified method and improved apparatus for overcoming the difficulties in vulcanizing tires now experienced by those engaged in the tire repair business. The invention eliminates the use of the air bags in vulcanizing tire casings and provides the economical method of substituting inner tubes and portions of automobile rims for the apparatus now used.

Another object of the present invention is to provide a novel method and improved apparatus for vulcanizing straight side tires and clencher tires with one style of mold.

A further object of the present invention is to provide a novel and economical method of vulcanizing the tread and side walls of an automobile tire casing, without the customary use of sand bags and expensive equipment.

A further object of the present invention is to provide the improved device just characterized which may be used in connection with the ordinary tire vulcanizing mold without change or alteration in the construction thereof.

In the drawings forming a part of this application:

Fig. 1 is a cross sectional view of an automobile tire, inserted with a mold and in position to be vulcanized; and Fig. 2 corresponds to Fig. 1 and shows a transverse sectional view of the tire and mold.

Referring to the drawing, the numeral 1 represents an automobile tire casing inserted in the mold 2, which is one of the well known kind now used for vulcanizing purposes. The mold 2 is provided with a steam cavity 3 between its arc shaped walls, and with a steam inlet 4 and an outlet 5. A pair of removable bead irons 6 fit over the bead of the tire casing and part way down the walls of the same, thereby holding the casing in position to be vulcanized. A clamping means, comprising a V-shaped iron 7 having its ends engaging with notches in the mold 2, through the central part of which is screwed a turn screw 8, provides a means for forcing the bead irons firmly against the bead of the tire. Inside the tire casing 1 is inserted an inner tube 9 and a flap 10, both of which are placed in their ordinary positions within the tire casing in the usual way. To the bead of the tire casing is affixed in the usual manner, a tire rim 11, a section of which is cut off so that the ends of the rim 12 and 13 fit up against the tire mold 2. In other words the rim 11 is so shaped that it fits on the tire in the usual manner except for the part of the tire that is within the mold 2.

In carrying out my invention, I firstly insert the inner tube 9 and the flap 10 in their proper positions within the casing which is to be vulcanized. The rim 11 is applied to the bead of tire casing 1 in the usual manner, with the part of the casing to be placed in the mold 2 not covered thereby. The tire casing 1, with the inner tube 9, flap 10 and rim 11 in their proper positions, is placed in the mold 2, with the ends 12 and 13 of the rim butting up against the ends of the mold. The bead irons 6 are placed over the bead of the tire within the mold in the usual manner, and the turn screw 8 screwed within the V-shaped iron 7, is screwed up until the proper pressure is exerted upon the bead irons 6. Air is forced through the stem 14 of the inner tube 9 to the desired pressure, after which steam is admitted into cavity 3 through inlet 4, in the usual manner, and the proper amount of heat to vulcanize the tire is thereby transmitted to the latter. After the tire is thus properly vulcanized, the screw 8 is unscrewed and the tire is removed from the mold, by withdrawal of the bead irons 6.

By means of the present invention the well known air bags now commonly used are eliminated, and second hand or old inner tubes are used in their place. The rim used in carrying out my invention may also be old, it only being necessary that it fit the tire casing, and that a part of it be cut away in order that its ends butt up against the ends of the mold when the tire is positioned therein. I have found that by using the method and device shown and described herein, better results can be accomplished in vulcanizing tires than by the use of the air bags which are both expensive and unsatisfactory.

Having described my invention, what I claim is:

1. The method of vulcanizing tires which comprises inserting an inner tube within a tire, attaching a rim on the tire except for the part thereof to be vulcanized, and curing the part of the tire to be vulcanized by means of a vulcanizing mold.

2. The method of vulcanizing tires which comprises inserting an inner tube and tire flap within the tire, attaching a tire rim to the section of the tire not to be vulcanized, inserting the section of the tire to be vulcanized within a vulcanizing mold, inflating the tire, and curing the part of tire within the mold by means of the mold.

3. The method of vulcanizing tires which comprises inserting an inner tube within a tire, securing a tire rim to the tire except for the section thereof to be vulcanized, inflating the tire and curing the said section which the rim is not attached in a vulcanizing mold.

4. A device of the class described comprising a segmental mold, bead engaging pressure members coacting with said mold and a rim with ends abutting said bead engaging members to form therewith a complete annulus.

5. A device of the class described comprising a segmental mold adapted to contain a section of a tire casing, bead engaging pressure members coacting with said mold, a rim abutting said bead engaging members to form therewith a complete annulus, and a tube adapted to be mounted within the tire casing.

6. A device of the class described comprising, a tire mold adapted to contain a portion of a tire casing, and a tire rim with ends abutting the tire mold to form a complete annulus.

7. A device of the class described comprising, a tire mold adapted to contain a portion of a tire casing, bead engaging pressure members coacting with said mold, a rim with ends abutting said bead engaging members to form a complete annulus, and a tube adapted to fit within the tire casing.

8. A device of the class described comprising, a segmental tire mold having bead engaging pressure members, and a rim with ends abutting the said members of the mold to form a complete annulus.

HUGO F. PLATT.